United States Patent [19]
Leimbach

[11] Patent Number: 5,704,460
[45] Date of Patent: Jan. 6, 1998

[54] FRICTION CLUTCH ASSEMBLY FOR A MOTOR VEHICLE WITH A CLUTCH ACTUATOR

[75] Inventor: Lutz Leimbach, Oberwerrn, Germany

[73] Assignee: Fichtel & Sachs AG, Schweinfurt, Germany

[21] Appl. No.: 594,865

[22] Filed: Jan. 31, 1996

[30] Foreign Application Priority Data

Feb. 1, 1995 [DE] Germany ................ 195 03 138.5

[51] Int. Cl.[6] .................. F16D 13/75; B60K 23/02
[52] U.S. Cl. .................. 192/70.25; 192/90; 192/111 A
[58] Field of Search ................ 192/40, 70.25, 192/84.6, 90, 111 A, 52.6; 74/462

[56] References Cited

U.S. PATENT DOCUMENTS

| | | | |
|---|---|---|---|
| 1,659,289 | 2/1928 | Gamble | 192/52.6 X |
| 3,327,548 | 6/1967 | Welch | 74/462 X |
| 4,207,972 | 6/1980 | Zeidler | 192/111 A |
| 4,671,400 | 6/1987 | Grunberg et al. | |
| 4,829,221 | 5/1989 | Grunberg et al. | |
| 4,878,396 | 11/1989 | Grunberg | 192/90 X |
| 4,890,711 | 1/1990 | Carmillet et al. | 192/90 X |
| 5,135,090 | 8/1992 | Bertin et al. | 192/90 X |
| 5,267,635 | 12/1993 | Peterson et al. | 192/84.6 X |

FOREIGN PATENT DOCUMENTS

| | | | |
|---|---|---|---|
| 2920932 | 11/1979 | Germany . | |
| 3706849 | 9/1988 | Germany . | |
| 4238368 | 5/1994 | Germany . | |
| 5-202952 | 8/1993 | Japan | 192/90 |

Primary Examiner—Richard M. Lorence
Attorney, Agent, or Firm—Nils H. Ljungman and Associates

[57] ABSTRACT

A friction clutch with an actuator for automated operation, having an electronic control system preferably located separately from the actuator. Whereby to reduce the intensity of the control currents for the electric motor of the actuator, there can be a compensating spring which assists the actuation force of the friction clutch, a mechanism which automatically compensates for wear inside the friction clutch, an optimally-efficient, helical spur gear with involute gear teeth, as well as a device to reduce the release force of the friction clutch.

20 Claims, 4 Drawing Sheets

FRICTION CLUTCH ASSEMBLY FOR A MOTOR VEHICLE WITH A CLUTCH ACTUATOR

BACKGROUND OF THE INVENTION

1. Field of the Invention

The present invention generally relates to a friction clutch with an actuator.

2. Background Information

The known actuator is driven by a motor which is controlled by a control system. The motor acts by means of a step-down, or reducing transmission on an output part which is actively connected to the actuation elements of the friction clutch. The step-down transmission is realized in the form of a spur gear. A compensating spring acts on the output part of the transmission and assists the motor during the release of the friction clutch. The control system which controls the motor is also installed in the transmission housing.

OBJECT OF THE INVENTION

It is an object of the present invention to create a friction clutch with an actuator for automated operation so that the actuator essentially occupies a minimal amount of space, is very lightweight and can therefore be manufactured economically, whereby the electronic control system is also located separately from the actuator.

SUMMARY OF THE INVENTION

The present invention teaches that the object, as described hereinabove, can be achieved, in accordance with at least one preferred embodiment, in that the friction clutch can be provided with an actuator for automated operation, comprising a control system which can preferably be located separately from the actuator, an electric motor, a step-down transmission with a housing (the input part of which can be driven by the motor and the output part of which can be actively connected by means of a transmission element with the actuation elements of the friction clutch), a compensating spring to assist the actuation force of the friction clutch, and a device for the automatic compensation for wear inside the friction clutch, to keep the actuation force of the friction clutch essentially constant.

One disadvantage of known solutions is, for example, that at least the power electronics are integrated into the actuator, which essentially can make the actuator heavier and more expensive. The power electronics can also generate heat in addition to the heat which could already be generated by the electric motor. Therefore, the electric motor itself essentially must be sized so that it can compensate for the loss of efficiency of a hydraulic transmission path, the increase in the release force when there is wear inside the friction clutch, and the relatively large control currents or forces required when a membrane spring is used in the friction clutch. Thus, the electric motor essentially must be oversized to a relatively great extent and operate with an essentially very high control current, even in unfavorable surroundings. When such high control currents are used, it is essentially impossible to install the power electronics in a separate location simply because they essentially generate large electromagnetic waves which can interfere with other electrical components in the motor vehicle.

As a result of one configuration of the present invention, it may be possible to reduce the intensity of the control currents for the electric motor so that the electronic control system can preferably be located at some distance from the actuator. Thus, the electronic control system can be located at a suitable site in the motor vehicle, where it would preferably be subjected to significantly lower thermal and mechanical loads. It can thereby be possible, for example, to essentially integrate the electronic control system into the electronic control system which is preferably already present in the vehicle. The compensating spring which can assist the actuation force of the friction clutch can thereby be designed and operate as set forth in Unexamined German Patent Application 37 06 849. The apparatus for the automatic compensation of wear inside the friction clutch, for the most part to compensate for wear to the friction linings on the clutch disc, can be realized in a variety of ways. One possible embodiment is described in greater detail in German Patent 29 20 932. As a result of the presence of an automatic wear compensation mechanism in the friction clutch it can be possible to have the main spring of the friction clutch, which can preferably be realized in the form of a membrane spring, operate at a single operating point, so that there is essentially no need to provide an increased drive power by means of the electric motor over the useful life of the friction clutch.

In accordance with an additional advantageous embodiment of the present invention, the friction clutch can be provided with an actuator for automated operation, comprising an electronic control system located separately from the actuator, an electric motor, a step-down transmission with a housing (the input part of which can be driven by the electric motor and the output part of which can be actively connected by means of a transmission element with the actuation elements of the friction clutch), whereby the step-down transmission can be realized in the form of helical spur gear (in particular with involute gear teeth, with an input gear wheel which can preferably have a maximum of seven teeth), as well as a device to automatically compensate for wear inside the friction clutch, to keep the actuation force of the friction clutch essentially constant.

In this case, the automatic wear adjustment device described hereinabove can preferably be advantageously combined with a spur gear in the actuator, which spur gear can be provided, in particular, with involute gear teeth and on which the input gear wheel can preferably have a maximum of seven teeth. Such a transmission system can make it possible to achieve the necessary translation between the electric motor and the transmission element in a single stage, whereby the above-mentioned gear teeth can have a particularly favorable efficiency. As a result of these two measures, it may be possible to essentially reduce the current intensities used to control the electric motor to the point where at least the electronic control system can be installed separately from the actuator in the vehicle. The actuator thereby can preferably become small, lightweight and economical, and there may essentially be no problems integrating it into the engine compartment.

In accordance with an additional embodiment of the present invention, a friction clutch with an actuator for automated operation can provide an electronic control system located separately from the actuator, plus an electric motor, a step-down transmission with housing (the input part of which can be driven by the electric motor, and the output part of which can be actively connected by means of a transmission element with the actuation elements of the friction clutch), whereby the step-down transmission can be realized in the form of a helical spur gear (in particular with involute gear teeth, with an input gear wheel which has a maximum of seven teeth), a compensating spring to assist the actuation force of the friction clutch, and a device for the automatic compensation for wear inside the friction clutch, to keep the actuation force of the friction clutch essentially constant. As a result of the use of an essentially optimally efficient spur gear (in particular one with involute gear teeth, which is designed in a single stage and with an input gear wheel which has a maximum of seven teeth), as well as by providing a compensating spring in the actuator to assist the electric motor during the release of the clutch, and by means of a device for the automatic compensation for wear inside the friction clutch (in particular the wear of the friction linings of the clutch disc) to keep the actuation force of the friction clutch constant, it can essentially be possible to reduce the intensity of the current which may be required to actuate the electric motor, so that the control currents are on the order of magnitude of the currents used by the other electrical consumers in the automobile, which can mean that thick cable may not need to be laid, nor would there be any danger of electromagnetic interference with other devices. Thus it can be possible to install the complete electronic control system, above all together with the power electronics, separately in the motor vehicle, and preferably in a location which is better protected against the effects of temperature and vibrations.

A further teaching of the present invention can be found in an embodiment of a friction clutch with an actuator for automated operation, comprising an electronic control system located separately from the actuator, an electric motor, a step-down transmission with a housing (the input part of which can be driven by the electric motor and the output part of which can be actively connected by means of a transmission element with the actuation elements of the friction clutch), a compensating spring to assist the actuation force of the friction clutch, and a device for the automatic compensation for wear inside the friction clutch (to keep the actuation force of the friction clutch constant), as well as a device to reduce the release force of the friction clutch.

As a result of the presence of a mechanism which can make an automatic compensation to adjust for wear inside the friction clutch (in particular wear on the friction linings of the clutch disc), it can be possible to balance, or adjust the compensating spring to the main clutch spring, since the force of the main clutch spring should be kept constant over the entire useful life of the friction clutch. In combination with a device which can be simultaneously provided to reduce the release force, it thus can become possible to control the electric motor of the actuator by means of essentially very low current intensities. This can essentially mean that the electronic control system, at least in its power part, can be made significantly smaller with lower thermal losses, and the line from the electronic control system to the electric motor can be laid in a manner essentially similar to that of any other electric line in the motor vehicle. Thus the device to reduce the release force of the friction clutch can essentially be designed in a variety of ways. One possibility can be to provide, in the release direction, a membrane spring which can have a sharply degressive characteristic as a main clutch spring with an elastic member inside the actuation path, so that this elastic element can counteract the main clutch spring and effect a reduction of the actuation force. The elastic member can, for example, be integrated into the clutch housing, but it can also be realized, for example, in the form of a lining spring of the clutch disc.

The present invention also teaches that one embodiment of a friction clutch with an actuator for automated operation can be provided with the following elements: an electronic control system located separately from the actuator, an electric motor, a step-down transmission with a housing (the input part of which can be driven by the electric motor and the output part of which can be actively connected by means of a transmission element with the actuation elements of the friction clutch), whereby the step-down transmission can be realized as a helical spur gear (in particular with involute gear teeth, with an input gear wheel which has a maximum of seven teeth), a device to automatically compensate for wear inside the friction clutch (to keep the actuation force of the friction clutch constant), as well as a device to reduce the release force of the friction clutch.

As a result of the combination of an efficient spur gear with a device which can make an automatic adjustment for wear inside the friction clutch and a device to reduce the release force of the friction clutch, it can be possible to reduce the control currents for the electric motor to the point where the control currents preferably no longer cause any electromagnetic interference with the other electrical consumers in the vehicle. It can therefore be possible to install the electronic control system at a location in the vehicle which would be particularly favorable for such a component.

The present invention also teaches that an embodiment of a friction clutch with an actuator for automated operation preferably comprises the following components: an electronic control system located separately from the actuator, an electric motor, a step-down transmission with a housing (the input part of which is driven by the electric motor and the output part of which is actively connected by means of a transmission element with the actuation elements of the friction clutch), whereby the transmission can be realized as a helical spur gear (in particular with involute gear teeth, with an input gear wheel which can have a maximum of seven teeth), a compensating spring to assist the actuation force of the friction clutch, a device which can automatically compensate for wear inside the friction clutch to keep the actuation force of the friction clutch constant, as well as a device to reduce the release force of the friction clutch.

As a result of the combination of the actuator with an optimally efficient spur gear, with a compensating spring to assist the actuation force of the friction clutch, with a device to automatically compensate for wear inside the friction clutch, and with a device to reduce the release force of the friction clutch, it can preferably be possible to use extremely low control currents for the electric motor, so that the electronic control system can be located separately from the actuator at a site in the vehicle which would be particularly favorable for such a component.

In one preferred embodiment of the device to reduce the release force of the friction clutch, there can be a clutch disc, the friction linings on which can have a ratio of less than 1.4 between the outside diameter $D_a$ and the inside diameter $D_i$. Such a clutch disc can have an average friction radius which can be significantly larger than conventional clutch discs, so that given the same torque transmission capability of the friction clutch, the application force can be reduced. The reduction of the application force can make it possible to essentially reduce the actuation forces by a similar amount.

The present invention also teaches that the actuator can be fastened directly to a component which is fixed to the engine, in particular to the clutch housing, and the transmission element of the actuator can be made to act directly on the release fork of the friction clutch. Using this solution, which can become possible essentially only as a result of the reduction in the size of the actuator and the separate installation of the electronic control system, all the transmission devices which could involve losses (cables with hoses, hydraulic systems) can preferably be eliminated, and a direct clutch actuation can be realized.

The ability to locate the electronic control system separately from the actuator can also make it possible to preferably integrate this electronic control system in whole or in part into the existing electronic system of the motor vehicle. It may thereby become possible to significantly reduce the cost of sensors and electrical connection cables. Preferably, the entire electronic control system can thereby be located centrally, where it would be much more accessible for maintenance and repair work.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

In summary, one aspect of the present invention resides broadly in a friction clutch with an actuator for automated operation, comprising an electronic control system located separately from the actuator, an electric motor, a step-down, or reducing transmission with a housing, the input part of which is driven by the electric motor, and the output part of which is actively connected by means of a transmission element with the actuation elements of the friction clutch, a compensating spring to assist the actuation force of the friction clutch and a device to automatically compensate for wear inside the friction clutch, to keep the actuation force of the friction clutch constant.

Another aspect of the present invention resides broadly in a friction clutch with an actuator for automated operation, comprising an electronic control system located separately from the actuator, an electric motor, a step-down transmission with a housing, the input part of which is driven by the electric motor, and the output part of which is actively connected by means of a transmission element with the actuation elements of the friction clutch, whereby the step-down transmission is realized in the form of a helical spur gear, in particular with involute gear teeth, with an input gear wheel which has a maximum of seven teeth, as well as a device to automatically compensate for wear inside the friction clutch, to keep the actuation force of the friction clutch constant.

BRIEF DESCRIPTION OF THE DRAWINGS

The present invention is explained in greater detail herebelow with reference to the embodiments illustrated in the accompanying drawings, in which.

DESCRIPTION OF THE PREFERRED EMBODIMENT

Figure 1:
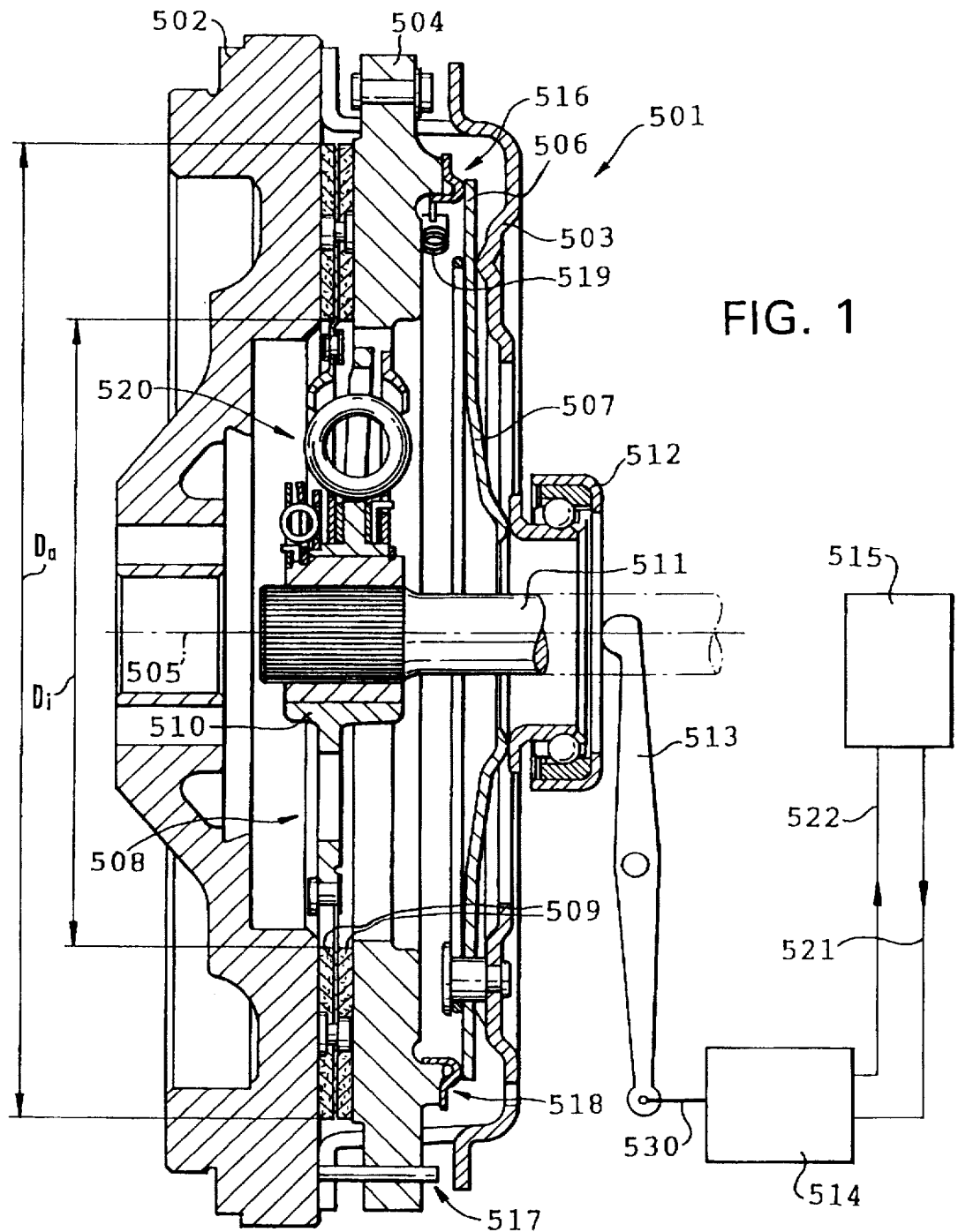
FIG. 1 shows a friction clutch in longitudinal section, with a schematic illustration of the actuator and the electronic control system.
Figure 2A:
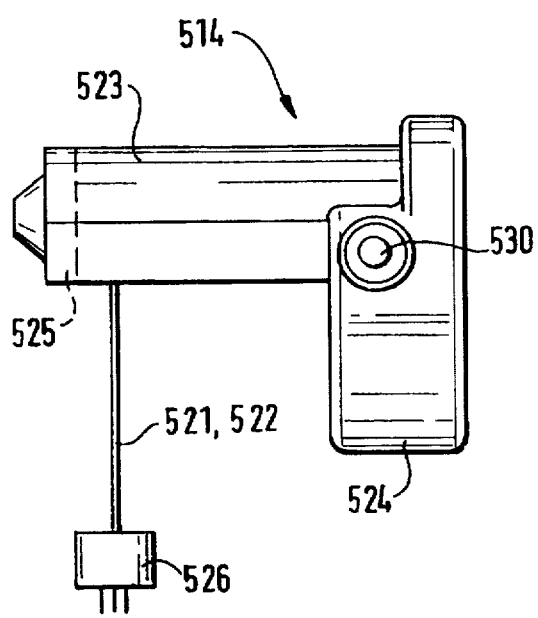
FIGS. 2a-c show three views of the actuator.
Figure 2B:
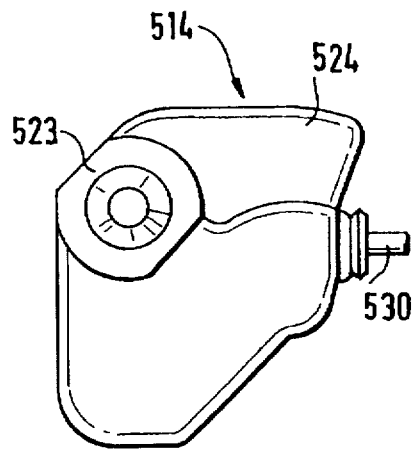
Figure 2C:
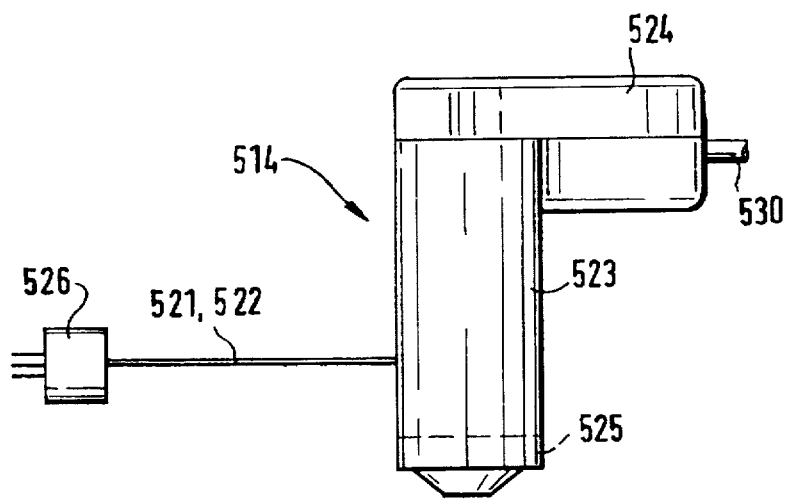

As shown in FIG. 1, a friction clutch 501 can include a flywheel 502 fastened to a crankshaft (not shown). The clutch housing 503 can be firmly mounted on the flywheel 502. Inside the clutch housing 503 there can preferably be an application plate 504 which can be non-rotationally connected to the clutch housing 503, but which can be guided so that it can move axially. This guidance can be conventionally provided by means of tangential leaf springs. Pressure could be applied to the application plate toward the flywheel 502 by a main clutch spring which could be in the form of a membrane spring 506. The membrane spring 506 can preferably be mounted so that it can pivot on an intermediate diameter on the clutch housing 503, act with its radially outer edge on the application plate 504, and be provided toward the radial inside with a plurality of flexible tabs 507. These flexible tabs 507 can be elastically deformed toward the flywheel 502 by a release bearing 512, whereby the membrane spring 506 can preferably pivot in the opposite direction on its outside periphery and release the application plate 504. The release bearing 512 can be actuated by means of a release fork 513, which release fork 513 can be connected by means of a transmission element 530 to an actuator 514, which actuator 514 can be controlled by means of an electronic control system 515, which electronic control system 515 can be connected to the actuator 514 by means of a control line 521 and/or by means of a sensor line 522.

A clutch disc 508, which can preferably have friction linings 509 in its radially outer area, can be located axially between the flywheel 502 and the application plate 504. The clutch disc 508 can be provided with a torsional vibration damper 520. The clutch disc 508 can be non-rotationally mounted by means of hub 510 on the transmission shaft 511, which transmission shaft 511 defines an axis of rotation 505.

All the components of the friction clutch 501 which would be driven by the flywheel 502 can rotate around the axis of rotation 505. The friction clutch 501 can be provided with a device 516 which would make an automatic adjustment to compensate for wear. This device 516 can consist, for example, of a turning ring 518 which can preferably be located on the application plate 504 and essentially concentric to the axis of rotation 505, namely between the application plate 504 and the membrane spring 506.

Opposite the application plate 504, the turning ring 518 can be provided with bevelled surfaces which would preferably run in the peripheral direction, and the turning ring 518 can be biased in the peripheral direction by a spring 519. The force of the spring 519 can be directed so that during a rotational motion, the turning ring 518 can run up over the bevelled surfaces and increase the distance from the application plate 504. The application plate 504 can also be provided with a travel limiting device 517 which would preferably limit the release movement of the application plate 504 with respect to the clutch housing 503.

In this case, the clutch disc 508 is provided with friction linings 509, the ratio of the outside diameter $D_a$ of which to the inside diameter $D_i$ is less than 1.4. In this manner, a very large average friction radius can be provided with reference to the outside diameter $Da$, which means that the friction clutch 501 can preferably be operated with a low application force of the membrane spring 506.

FIGS. 1, 2a-c, and 3 show various views, as well as an enlarged illustration with a schematic illustration, of the internal construction of the actuator 514. The actuator 514 can be provided with an electric motor 523 which can be fastened to a transmission housing 524. The electric motor can extend into the transmission housing 524 by means of the gear wheel 531 which can be fastened to the motor shaft.

The electric motor 523 can also contain a distance sensor 525 which would preferably indicate the position of the electric motor 523. An electric connecting cable 521, 522 with a plug 526 can run from the electric motor 523 to the electronic control system 515. By means of this connecting cable 521, 522, the control current can be transmitted to the electric motor 523, along with the feedback of the position of the electric motor 523 as measured by the distance sensor 525.

Figure 3:
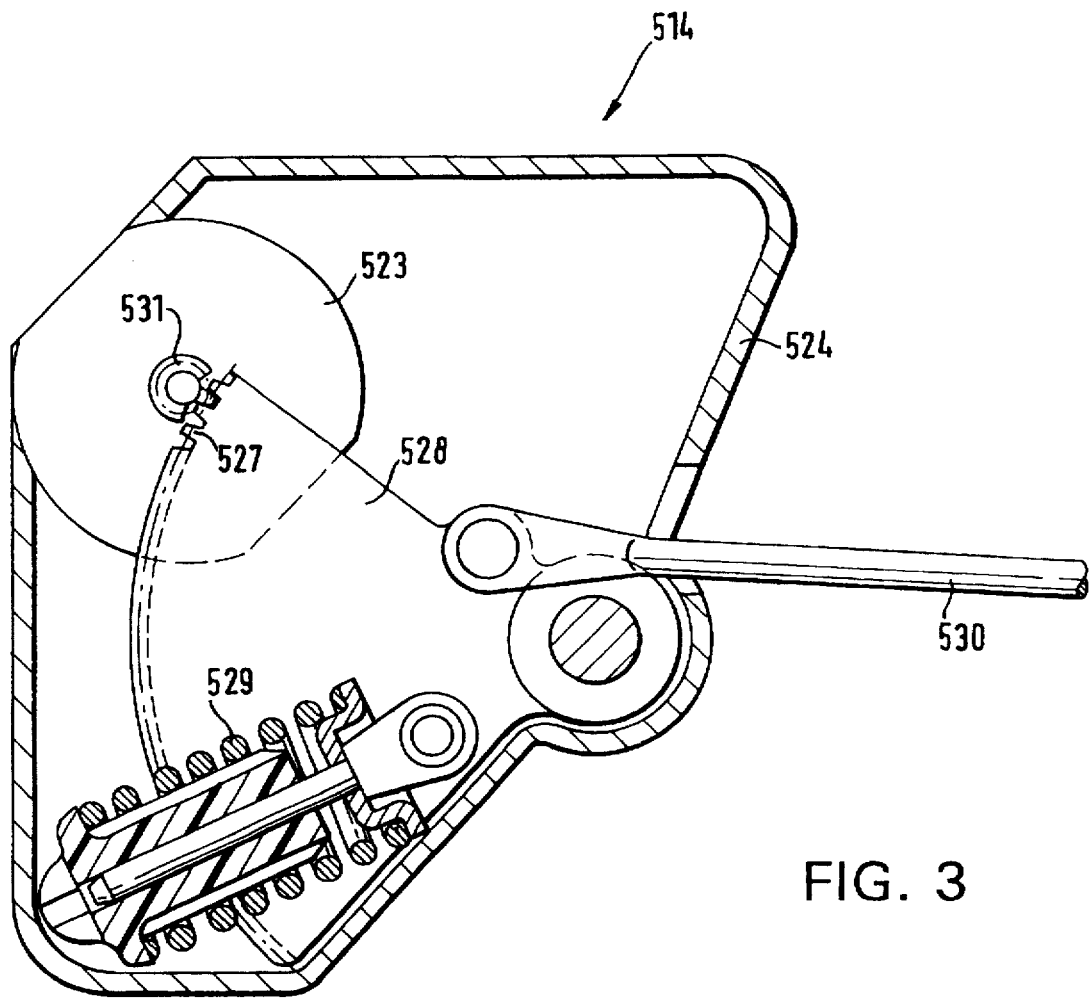
FIG. 3 is an enlarged illustration of an actuator with a schematic illustration of the internal construction.

In the transmission housing 524, as shown in FIG. 3, a segment gear wheel 528 can be mounted so that it can pivot, and can be connected to the motor shaft of the electric motor 523 by means of a spur gear 527. This spur gear 527 can preferably be, in a particularly advantageous manner, a helical spur gear with involute gear teeth, whereby the input gear wheel 531 on the shaft of the electric motor 523 might have a maximum of seven teeth, and preferably a maximum of three teeth. Such a system of gear teeth can be particularly efficient, and on account of the low number of teeth of the gear wheel 531, a single-stage realization of the transmission can be possible.

Also acting on the segment gear wheel 528 can be a compensating spring 529 which, when the friction clutch 501 would be engaged, can assume a top dead center position, and in this position essentially would not exert any force on the system. Also engaged with the segment gear wheel 528 can be a transmission element 530 which can be actively connected (see FIG. 1) to the release fork 513.

The friction clutch 501 with the actuator 514 for automated operation as described hereinabove can preferably function as follows:

The electronic control system 515, preferably installed in the motor vehicle in a protected site, can, by means of sensors, identify the operator's command to actuate the clutch. If—starting from the illustration in FIG. 1 which shows the clutch in the engaged status—the operator wishes to release the clutch, the electronic control system 515 can supply a control voltage for the electric motor 523 of the actuator 514 so that the control current can drive the electric motor 523. The electric motor 523, by means of the spur gear 527, would drive the segment gear wheel 528, whereupon the transmission element 530 could move the release fork 513 so that the release bearing 512 would move the flexible tabs 507 of the membrane spring 506 toward the flywheel 502, so that the application plate 504 can lift up from the flywheel 502 and release the friction linings 509 of the clutch disc 508. This movement can be assisted by the compensating spring 529.

As a result of the separate installation of the electronic control system 515 and the actuator 514, it can therefore be possible to locate the actuator 514 directly on a component which would be firmly connected to the engine, e.g. to the clutch housing, whereupon it can become possible to drive the release fork 513 directly without mechanical transmission losses. Such a system was essentially not possible in known friction clutches, since at least the power electronics had to be located in the actuator 514 in order to avoid long lines carrying strong control currents. Thus the actuator 514 was essentially directly exposed both to high temperatures and to the vibrations of the engine.

To further reduce the intensity of the control currents for the electric motor 523, not only can the essentially optimally efficient spur gear 527 be provided, but the measures described herebelow can also be very advantageous. The friction clutch 501 can be provided with a device 516 which can make automatic adjustments to compensate for wear inside the friction clutch 501. The principal wear in question is the wear to the friction linings 509 of the clutch disc 508, but other types of wear can also be taken into consideration. The device 516, together with the distance, or travel limiting device 517, can essentially guarantee that when wear would occur to the friction linings 509, and when the clutch would be in the released position, the application plate 504 could be limited in its backward motion following the release of the clutch disc 508, so that the gap which can thereby be formed between the outside diameter of the membrane spring 506 and the turning ring 518 can preferably be compensated for by a rotation of the turning ring 518 caused by the spring 519.

Consequently, over the entire useful life of the friction clutch 501, the membrane spring 506 will essentially remain in position inside the clutch housing 503, and would thus keep its application force as well as its release force essentially constant. Therefore all the parts of the actuation device of the friction clutch 501 can preferably be precisely coordinated, or balanced, with this membrane spring force, and essentially no additional safety measures need to be employed. That can also be essentially true for the supply of the maximum control current to the electric motor 523.

Figure 4B:
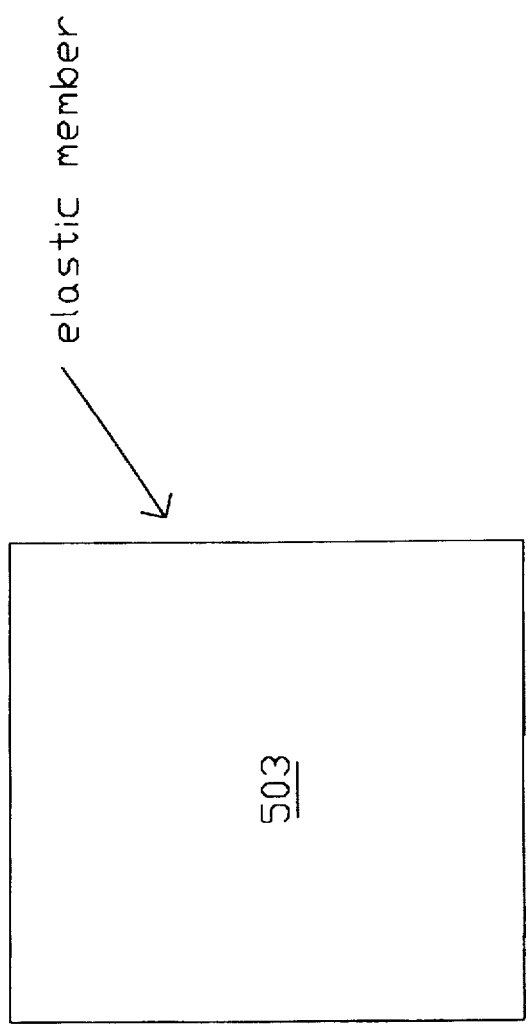
FIG. 4a and 4b show schematic illustrations of portions of at least one embodiment of a friction clutch.
Figure 4A:
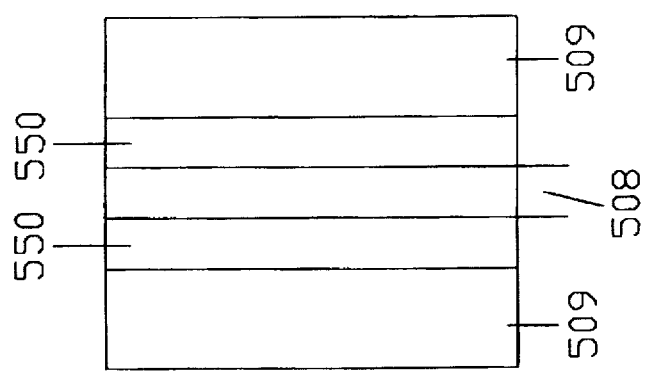

There can also be a device which can achieve a gradual reduction of the torque transmitted, which can contain, for example, a system of springs 508 (schematically shown in FIG. 4a) for the friction linings 509, or the elastic flexibility of the clutch housing 503 (schematically shown in FIG. 4b) which, together with a curve of the spring force of the membrane spring 506 which can descend in the release direction, can essentially guarantee that the actuation force of the membrane spring 506 can be reduced.

Another possibility is that the ratio of the outside diameter $D_a$ to the inside diameter $D_i$ of the friction linings 509 can be reduced to less than 1.4. The result can be that the effective friction radius on the friction linings 509 can be shifted radially outward, so that given the same torque transmission capability of the friction clutch 501, the application force of the membrane spring 506 can be reduced. In connection with the compensating spring 529 located in the actuator 514, which compensating spring 529 can assist the release process of the friction clutch 501, it can essentially be possible to very significantly reduce the intensity of the control currents required in the prior art for the electric motor 523, which can make it possible to install the electronic control system 515 separately from the actuator 514, since the control currents can essentially be no longer of a magnitude which can interfere with the other electrical consumers in the motor vehicle.

One feature of the invention resides broadly in the friction clutch with an actuator for automated operation, comprising an electronic control system located separately from the actuator, an electric motor, a step-down, or reducing transmission with a housing, the input part of which is driven by the electric motor, and the output part of which is actively connected by means of a transmission element with the actuation elements of the friction clutch, a compensating spring to assist the actuation force of the friction clutch and a device to automatically compensate for wear inside the friction clutch, to keep the actuation force of the friction clutch constant.

Another feature of the invention resides broadly in the friction clutch with an actuator for automated operation, comprising an electronic control system located separately from the actuator, an electric motor, a step-down transmission with a housing, the input part of which is driven by the electric motor, and the output part of which is actively connected by means of a transmission element with the actuation elements of the friction clutch, whereby the step-down transmission is realized in the form of a helical spur gear, in particular with involute gear teeth, with an input gear wheel which has a maximum of seven teeth, as well as a device to automatically compensate for wear inside the friction clutch, to keep the actuation force of the friction clutch constant.

Yet another feature of the invention resides broadly in the friction clutch with an actuator for automated operation, comprising an electronic control system located separately from the actuator, an electric motor, a step-down transmission with a housing, the input part of which is driven by the electric motor, and the output part of which is actively connected by means of a transmission element with the actuation elements of the friction clutch, whereby the step-down transmission is realized in the form of a helical spur gear, in particular with involute gear teeth, with an input gear wheel which has a maximum of seven teeth, a compensating spring to assist the actuation force of the friction clutch, as well as a device to automatically compensate for wear inside the friction clutch, to keep the actuation force of the friction clutch constant.

Still another feature of the invention resides broadly in the friction clutch with an actuator for automated operation, comprising an electronic control system located separately from the actuator, an electric motor, a step-down transmission with a housing, the input part of which is driven by the electric motor, and the output part of which is actively connected by means of a transmission element with the actuation elements of the friction clutch, a compensating spring to assist the actuation force of the friction clutch a device to automatically compensate for wear inside the friction clutch, to keep the actuation force of the friction clutch constant, as well as a device to reduce the release force of the friction clutch.

A further feature of the invention resides broadly in the friction clutch with an actuator for automated operation, comprising an electronic control system located separately from the actuator, an electric motor, a step-down transmission with a housing, the input part of which is driven by the electric motor, and the output part of which is actively connected by means of a transmission element with the actuation elements of the friction clutch, whereby the step-down transmission is realized in the form of a helical spur gear, in particular with involute gear teeth, with an input gear wheel which has a maximum of seven teeth, as well as a device to automatically compensate for wear inside the friction clutch, to keep the actuation force of the friction clutch constant, as well as a device to reduce the release force of the friction clutch.

Another feature of the invention resides broadly in the friction clutch with an actuator for automated operation, comprising an electronic control system located separately from the actuator, an electric motor, a step-down transmission with a housing, the input part of which is driven by the electric motor, and the output part of which is actively connected by means of a transmission element with the actuation elements of the friction clutch, whereby the step-down transmission is realized in the form of a helical spur gear, in particular with involute gear teeth, with an input gear wheel which has a maximum of seven teeth, a compensating spring to assist the actuation force of the friction clutch, as well as a device to automatically compensate for wear inside the friction clutch, to keep the actuation force of the friction clutch constant, and a device to reduce the release force of the friction clutch.

Yet another feature of the invention resides broadly in the friction clutch characterized by the fact that the device to reduce the release force of the friction clutch contains a clutch disc which has friction linings on which the ratio of the outside diameter $D_a$ to the inside diameter $D_i$ is less than 1.4.

Still another feature of the invention resides broadly in the friction clutch characterized by the fact that the actuator is fastened directly to a component which is firmly fastened to the engine, in particular to the clutch housing, and its transmission element acts directly on the release fork of the friction clutch.

Types of clutch assemblies which have wear sensors or adjustment mechanisms for detecting and adjusting for the wear of the friction linings of a clutch may be disclosed by the following United States Patents: U.S. Pat. No. 4,191,285 to Thelander et al. on Mar. 4, 1980, entitled "Wear Compensator for Belleville Spring Clutch"; U.S. Pat. No. 5,238,093 to Campbell on Aug. 24, 1993, entitled "Wear Indicator for Adjustable Clutch"; U.S. Pat. No. 4,953,680 to Flotow on Sep. 4, 1990, entitled "Clutch Adjuster"; U.S. Pat. No. 4,549,643 to Flotow et al. on Oct. 29, 1985, entitled "Self Adjusting Device for a Friction Clutch"; U.S. Pat. No. 4,310,086 to Mochida on Jan. 12, 1982, entitled "Automatic Adjusting Device for a Clutch Operating Mechanism"; and U.S. Pat. No. 4,285,424 to Sink et al. on Aug. 25, 1981, entitled "Locking Device for a Friction Type Clutch".

Types of manual transmissions in which the present invention may be incorporated may be disclosed by the following United States Patents: U.S. Pat. No. 5,036,721 to Gugin on Aug. 6, 1991, entitled "Shift Control Mechanism for a Manual Transmission"; U.S. Pat. No. 4,222,283 to Nagy on Sep. 16, 1980, entitled "Manual Transmission Lubrication System"; U.S. Pat. No. 3,858,460 to Porter et al. on Jan. 7, 1975, entitled "Four Speed Manual Transmission and Control"; and U.S. Pat. No. 5,269,400 to Fogelberg on Dec. 14, 1993, entitled "Transmission Synchronizer".

Types of clutch assemblies in which the present invention may be incorporated may be disclosed by the following United States Patents: U.S. Pat. No. 4,635,780 to Wiggen on Jan. 13, 1987, entitled "Clutch Disc for a Motor Vehicle Friction Clutch"; U.S. Pat. No. 4,684,007 to Maucher on Aug. 4, 1987, entitled "Clutch Plate"; U.S. Pat. No. 4,433,771 to Caray on Feb. 28, 1984, entitled "Torsion Damping Device for a Clutch Plate"; and U.S. Pat. No. 4,099,604 to Higgerson on Jul. 11, 1978, entitled "Friction Clutch with Integral Adjuster".

Examples of friction clutches with adjustment for wear, having components that may be utilized in accordance with the embodiments of the present invention, may be found in Federal Republic of Germany Patent No. P 1 294 229.

Examples of friction clutches with actuators, having components that may be utilized in accordance with the embodiments of the present invention, may be found in Federal Republic of Germany Patent No. P 1 294 229.

Types of clutch discs, and various components thereof, which may be utilized in accordance with at least one embodiment of the present invention may be disclosed in the following U.S. Patents: U.S. Pat. No. 5,251,736 to Jeppe et al. on Oct. 12, 1993, entitled "Clutch Plate for a Motor Vehicle Friction Clutch"; U.S. Pat. No. 5,249,660 to Feldhaus et al. on Oct. 5, 1993, entitled "Clutch Disc for a Motor Vehicle Friction Clutch"; U.S. Pat. No. 5,238,096 to Ament et al. on Aug. 24, 1993, entitled "Clutch Plate for a Motor Vehicle Friction Clutch"; and U.S. Pat. No. 5,016,744 to Fischer et al. on May 21, 1991, entitled "Clutch Disc for a Friction Clutch".

Some examples of release assemblies for friction clutches and various components thereof, and some examples of friction clutches and various components thereof, which may be utilized in accordance with at least one embodiment of the present invention, may be found in the following U.S. Patents: U.S. Pat. No. 4,201,282 to Ernst et al. on May 6, 1980, entitled "Clutch Release Assembly and Bearing Therefor"; U.S. Pat. No. 3,920,107 to Limbacher on Nov. 18, 1975, entitled "Self-Aligning Clutch Release Bearing Arrangement"; U.S. Pat. No. 4,781,050 to Link et al. on Oct. 3, 1989, entitled "Clutch Arrangement"; U.S. Pat. No. 4,542,813 to Schierling on Sep. 24, 1985, entitled "Frictional Clutch Assembly"; and U.S. Pat. No. 4,637,505 to Huber on Jan. 20, 1987, entitled "Fluid-operated Clutch Disengaging Apparatus".

Examples of membrane springs which could be used in accordance with at least one embodiment of the present invention can possibly be found in the following U.S. Patents: U.S. Pat. No. 5,240,227 to Sich on Aug. 31, 1993, entitled "Electromagnetically Operated Valve"; U.S. Pat. No. 4,890,815 to Hascher et al. on Jan. 2, 1990, entitled "Valve with Membrane Spring"; U.S. Pat. No. 4,535,816 to Feder et al. on Aug. 20, 1985, entitled "Pressure Controller"; U.S. Pat. No. 3,902,527 to Schwerin et al. on Sep. 2, 1975, entitled "Electromagnetically Actuatable Multipath Valve"; and U.S. Pat. No. 2,117,482 to Klix entitled "Clutch Lever Plate".

Some examples of electronic components which may be utilized in accordance with the present invention may be found in the following U.S. Patents: U.S. Pat. No. 5,325,082 entitled "Comprehensive Vehicle Information Storage System"; U.S. Pat. No. 5,199,325 entitled "Electronic Shift or Clutch Actuator for a Vehicle Transmission" to Dana Corporation; and U.S. Pat. No. 5,303,807 entitled "Electrohydraulic Device for Controlling the Engagement of the Clutch in Motor Vehicles and the Like" to Fadiel.

Some examples of thermal conductors which may be utilized in accordance with the present invention may be found in the following U.S. Patents: U.S. Pat. No. 5,199,165 entitled "Heat Pipe-electrical Interconnect Integration Method for Chip Modules" to Hewlett-Packard; U.S. Pat. No. 5,243,218 entitled "Cooling Structure for Electronics Devices" to Fujitsu; U.S. Pat. No. 5,296,310 entitled "High Conductivity Hybrid Material for Thermal Management" to Materials Science Corporation; and U.S. Pat. No. 5,345,107 entitled "Cooling Apparatus for Electronic Device" to Hitachi.

Some examples of seals for electronics components which may be utilized in accordance with the present invention may be found in the following U.S. Patents: U.S. Pat. No. 5,278,357 entitled "Electric Wire Holding Case Preventing Oil Leak" to Yazaki; U.S. Pat. No. 5,326,589 entitled "Method of Protecting Electronic or Electric Part" to Shin-Etsu; U.S. Pat. No. 5,243,131 entitled "Housing for an Electronic Circuit" to Bosch; and U.S. Pat. No. 5,282,114 entitled "Ruggedized Computer Assembly Providing Accessibility and Adaptability to, and Effective Cooling of, Electronic Components" to Codar.

Some examples of motor current sensors which may be utilized in accordance with the present invention may be found in the following U.S. Patents: U.S. Pat. No. 5,254,926 entitled "Current-mode Hysteresis Control for Controlling a Motor" to Ford; U.S. Pat. No. 5,281,900 entitled "DC Motor Controller" to Hyundai; U.S. Pat. No. 5,304,912 entitled "Control Apparatus for Induction Motor" to Hitachi; U.S. Pat. No. 5,313,151 entitled "Induction Type Electric Motor Drive Actuator System" to Rotork; and U.S. Pat. No. 5,350,988 entitled "Digital Motor Controller" to AlliedSignal, Inc.

Some examples of devices for testing electronic components which may be utilized in accordance with the present invention may be found in the following U.S. Patents: U.S. Pat. No. 5,289,117 entitled "Testing of Integrated Circuit Devices on Loaded Printed Circuit" to Everett Charles; U.S. Pat. No. 5,307,290 entitled "System for the Automatic Testing, Preferably on a Bench, of Electronic Control Systems Which are Intended to be Fitted in Vehicles" to Fiat; and U.S. Pat. No. 5,315,252 entitled "Automotive Test System with Input Protection" to SPX Corporation.

Some examples of optical and other systems which may be utilized with or in the present invention may be found in the following U.S. Patents:

U.S. Pat. No. 5,280,981, Inventor: Gordon R. Schulz, Title: End effector with load-sensitive digit actuation mechanisms; U.S. Pat. No. 5,250,888, Inventor: Hang du Yu, Title: Apparatus for and process of rotating a display; U.S. Pat. No. 5,191,284, Inventors: Roberto Moretti and Angelo Varvello, Title: Device for detecting the relative rotational speed of two elements in a vehicle wheel; U.S. Pat. No. 5,239,263, Inventors: Hitoshi Iwata, Katsuhiro Minami, Hisahiro Ando, Hisashi Hirose and Shigeru Iguchi, Title: Magnetic rotation sensor for rotary shaft; U.S. Pat. No. 5,252,919, Inventor: Saburo Uemura, Title: Apparatus producing trapezoidal waveforms from a pair of magnetic sensors for detecting the rotating angle of an object; U.S. Pat. No. 5,291,319, Inventor: Ellis D. Harris, Title: Rotating disc optical synchronization system using binary diffractive optical elements; U.S. Pat. No. 5,307,549, Inventors: Seisuke Tsutsumi and Nobuyuki Ito, Title: Apparatus and method for synchronized control of machine tools; U.S. Pat. No. 5,309,094, Inventors: Christian Rigaux and Pascal Lhote, Title: Bearing rotary speed sensor with concentric multipole magnetic rings axially aligned with collector branches; U.S. Pat. No. 5,192,877, Inventors: Jean Bittebierre and Philippe Biton, Title: Hall Effect Sensor and component providing differential detection; Inventors: Shigemi Murata and Masayuki Ikeuchi, Title: Angle detecting device having improved mounting arrangement for mounting Hall-effect sensor.

Some examples of control devices and other systems which might be used with or in the present invention are:

U.S. Pat. No. 4,852,419, Inventors: Friedrich Kittel, Dieter Lutz, Franz Nagler, Horst Oppitz and Gerhard Gasper, Title: Control device, in particular for a motor-vehicle friction clutch; U.S. Pat. No. 5,212,380, Inventors: Seiichi Sato, Kazuo Yamaguchi, Yoshi Kurosawa, Atsushi Ueda and Masami Matsumura, Title: Automotive engine control system with rotary encoder indexing; U.S. Pat. No. 5,326,160, Inventors: John P. Bayliss and Scan Byrnes, Title: Hydraulic systems for vehicles; U.S. Pat. No. 5,307,013, Inventors: Alfred J. Santos and Michael C. Brauer, Title: Digital position sensor system for detecting automatic transmission gear modes.

Some examples of hydraulic master cylinders which may be utilized in accordance with the present invention may be found in the following U.S. Patents: U.S. Pat. No. 5,211,099 entitled "Slave Cylinder for a Hydraulic Actuating System of a Motor Vehicle Friction Clutch" to Fichtel & Sachs; U.S. Pat. No. 5,213,187 entitled "Device Relating to a Semi-automatic Clutch for Vehicles"; U.S. Pat. No. 5,284,017 entitled "Hydraulic Master Cylinder" to Automotive Products; and U.S. Pat. No. 5,301,597 entitled "Hydraulic Cylinder" to Kugelfischer Schafer.

Some examples of clutch assemblies and various components associated therewith which could possibly utilize the present invention may be disclosed in the following U.S. Patents: U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of hydraulic clutch systems which could possibly utilize the piston-cylinder arrangement of the present invention are disclosed by the following U.S. Patents, each of which is assigned to the assignee of the present invention: U.S. Pat. No. 5,211,099 to Grosspietsch et al., dated May 18, 1993 and entitled "Slave Cylinder for a Hydraulic Actuating System of a Motor Vehicle Friction Clutch"; U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

Some additional examples of hydraulic and/or pneumatic devices which can possibly utilize the piston-cylinder arrangement of the present invention are disclosed by the following U.S. Patents: U.S. Pat. No. 5,092,125 to Leight et al., entitled "Seal"; U.S. Pat. No. 4,635,778 to Lederman, entitled "Fluid-Operated Piston"; U.S. Pat. No. 4,960,188 to Wossner, entitled "Single-Tube Vibration Damper of Variable Damping Force"; U.S. Pat. No. 5,064,030 to Wossner, entitled "Impact Damping Unit"; U.S. Pat. No. 4,599,860 to Parsons, entitled "Liquid Pressure Apparatus"; and U.S. Pat. No. 2,317,601 to Fowler on Mar. 7, 1940, entitled "Pressure Braking System".

Hydraulic braking systems which could also possibly utilize the present invention may be disclosed in the following U.S. Patents: U.S. Pat. No. 4,634,190 to Wupper, entitled "Hydraulic Brake System With Slip Control"; U.S. Pat. No. 4,643,488 to Reinartz, entitled Hydraulic Vehicle Servo Brake"; U.S. Pat. No. 4,643,489 to Reinartz et al., entitled "Hydraulic Brake System With Slip Control"; U.S. Pat. No. 4,656,833 to Belart, entitled "Hydraulic Brake System for Automotive Vehicles"; and U.S. Pat. No. 4,902,077 to Belart et al., entitled "Hydraulic Brake System".

An invention relating to a friction clutch with an actuator having a spur gear is shown in Unexamined German Patent Application 42 38 368.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. 195 03 138.5, filed on Feb. 1, 1995, having inventor Lutz Leimbach, and DE-OS 195 03 138.5 and DE-PS 195 03 138.5, are hereby, incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch system for a motor vehicle with an actuator for automated operation of said clutch, said friction clutch system comprising:

a clutch housing;

a clutch disc for being disposed on a transmission input shaft, the transmission input shaft having a rotational axis defining an axial direction parallel to the rotational axis, said clutch disc being axially movable along the axial direction;

pressure plate means for engaging and disengaging said clutch disc with a flywheel, said pressure plate means being axially movable along the axial direction;

said clutch disc comprising friction lining means disposed between said pressure plate means and the flywheel for contacting the flywheel and said pressure plate means upon engagement of said clutch disc;

means for engaging and disengaging said clutch disc and said pressure plate means;

said engaging and disengaging means comprising an actuator;

said engaging and disengaging means comprising an electronic control system;

said electronic control system comprising means for controlling said actuator;

said electronic control system being configured to be a separate component from said actuator;

said electronic control system comprising means for being disposed remotely from said actuator;

said actuator comprising an electric motor;

said actuator comprising an actuator output element;

said actuator output element having a predetermined original range of movement when said friction lining means is new, for engaging and disengaging said clutch disc and said pressure plate means;

wear compensation means; and said wear compensation means comprising means for substantially maintaining said actuator output element substantially within said predetermined original range of movement upon wear of said friction lining means to maintain a substantially constant actuation force required by said actuator to engage and disengage said clutch.

2. The friction clutch system according to claim 1, wherein:

said actuator element maintaining means comprises a wear compensation mechanism disposed inside said clutch housing;

said electric motor comprises shaft means;

said actuator comprises a step-down transmission;

said step-down transmission comprises means for connecting said electric motor output shaft means to said actuator output element;

said step-down transmission connecting means comprises:

a step-down transmission input part disposed on said electric motor shaft means; and a step-down transmission output part; and said step-down transmission output part is connected to said actuator output element.

3. The friction clutch system according to claim 2, wherein:

said actuator comprises means for assisting the actuation force of said actuator; and said assisting means comprises a compensation spring.

4. The friction clutch system according to claim 3, wherein:

said step-down transmission connecting means comprises a helical spur gear comprising involute gear teeth; and said step-down transmission input part comprises an input gear.

5. The friction clutch system according to claim 4, wherein said friction clutch system comprises means for reducing the release force of said friction clutch system to facilitate the actuation force of said actuator.

6. The friction clutch system according to claim 5, wherein:

said release force reducing means comprises said friction lining means; and said friction lining means comprises friction linings comprising an inside diameter and an outside diameter, the outside diameter is disposed farther from the axis of rotation than the inside diameter, the diameters have a dimensional ratio with respect to one another, and the dimensional ratio of the outside diameter to the inside diameter is substantially 1.4 or less.

7. The friction clutch system according to claim 6, wherein:

said actuator comprises an actuator housing;

said actuator housing is fastened to a component affixed to the engine of a motor vehicle;

said component comprises said clutch housing; and said input gear comprises a maximum of about seven teeth.

8. The friction clutch system according to claim 7, wherein:

said engaging and disengaging means comprises release fork means for actuating said pressure plate means;

said actuator output element comprises means for connecting to said release fork means;

said transmission output part comprises said helical spur gear;

said input gear meshes with and drives said helical spur gear;

said actuator comprises means for connecting said compensation spring with said helical spur gear;

said friction clutch system comprises membrane spring means disposed between said clutch housing and said pressure plate means for applying pressure to said pressure plate means;

said actuator element maintaining means comprises a ring-shaped portion disposed on said pressure plate means, said ring-shaped portion is disposed substantially adjacent said membrane spring means;

said friction clutch system comprises means for biasing said ring-shaped portion in the peripheral direction;

said biasing means comprises a spring element;

said actuator element maintaining means comprises said spring element;

said actuator element maintaining means comprises means for limiting movement of said pressure plate means toward said friction lining means upon wear within said friction clutch system;

said pressure plate means comprises a travel limiting element, said travel limiting element is disposed on said pressure plate means and is disposed to limit axial movement of said pressure plate means; and said movement limiting means comprises said spring element and said travel limiting element.

9. The friction clutch system according to claim 2, wherein:

said actuator comprises means for assisting the actuation force of said actuator; and said assisting means comprises a compensation spring.

10. The friction clutch system according to claim 9, wherein:

said step-down transmission connecting means comprises a helical spur gear comprising involute gear teeth; and said step-down transmission input part comprises an input gear.

11. The friction clutch system according to claim 10, wherein said friction clutch system comprises means for reducing the release force of said friction clutch system to facilitate the actuation force of said actuator.

12. The friction clutch system according to claim 11, wherein:

said release force reducing means comprises said friction lining means; and said friction lining means comprises friction linings comprising an inside diameter and an outside diameter, the outside diameter is disposed farther from the axis of rotation than the inside diameter, the diameters have a dimensional ratio with respect to one another, and the dimensional ratio of the outside diameter to the inside diameter is substantially 1.4 or less.

13. The friction clutch system according to claim 12, wherein:

said actuator comprises an actuator housing;

said actuator housing is fastened to a component affixed to the engine of a motor vehicle;

said component comprises said clutch housing;

said input gear comprises a maximum of about seven teeth;

said engaging and disengaging means comprises release fork means for actuating said pressure plate means;

said actuator output element comprises means for connecting to said release fork means;

said friction clutch system comprises membrane spring means disposed between said clutch housing and said pressure plate means for applying pressure to said pressure plate means;

said actuator element maintaining means comprises a ring-shaped portion disposed on said pressure plate means, said ring-shaped portion is disposed substantially adjacent said membrane spring means;

said friction clutch system comprises means for biasing said ring-shaped portion in the peripheral direction;

said biasing means comprises a spring element;

said actuator element maintaining means comprises said spring element;

said actuator element maintaining means comprises means for limiting movement of said pressure plate means toward said friction lining means upon wear within said friction clutch system and release of said clutch disc;

said pressure plate means comprises a travel limiting element, said travel limiting element is disposed on said pressure plate means and is disposed to limit axial movement of said pressure plate means; and said movement limiting means comprises said spring element and said travel limiting element.

14. The friction clutch system according to claim 2, wherein:

said step-down transmission connecting means comprises a helical spur gear comprising involute gear teeth;

said step-down transmission input part comprises an input gear;

said friction clutch system comprises means for reducing the release force of said friction clutch system to facilitate the actuation force of said actuator;

said release force reducing means comprises said friction lining means;

said friction lining means comprises friction linings comprising an inside diameter and an outside diameter, the outside diameter is disposed farther from the axis of rotation than the inside diameter, the diameters have a dimensional ratio with respect to one another, and the dimensional ratio of the outside diameter to the inside diameter is substantially 1.4 or less;

said actuator comprises an actuator housing;

said actuator housing is fastened to a component affixed to the engine of a motor vehicle;

said component comprises said clutch housing.

15. The friction clutch system according to claim 2, wherein:

said step-down transmission connecting means comprises a helical spur gear comprising involute gear teeth;

said step-down transmission input part comprises an input gear;

said input gear comprises a maximum of about seven teeth;

said actuator comprises an actuator housing;

said actuator housing is fastened to a component affixed to the engine of a motor vehicle;

said component comprises said clutch housing;

said engaging and disengaging means comprises release fork means for actuating said pressure plate means; and said actuator output element comprises means for connecting to said release fork means.

16. The friction clutch system according to claim 2, wherein:

said actuator comprises means for assisting the actuation force of said actuator;

said assisting means comprises a compensation spring;

said friction clutch system comprises means for reducing the release force of said friction clutch system to facilitate the actuation force of said actuator;

said release force reducing means comprises said friction lining means;

said friction lining means comprises friction linings comprising an inside diameter and an outside diameter, the outside diameter is disposed farther from the axis of rotation than the inside diameter, the diameters have a dimensional ratio with respect to one another, and the dimensional ratio of the outside diameter to the inside diameter is substantially 1.4 or less;

said actuator comprises an actuator housing;

said actuator housing is fastened to a component affixed to the engine of a motor vehicle;

said component comprises said clutch housing;

said engaging and disengaging means comprises release fork means for actuating said pressure plate means; and said actuator output element comprises means for connecting to said release fork means.

17. The friction clutch system according to claim 2, wherein:

said step-down transmission connecting means comprises a helical spur gear comprising involute gear teeth;

said step-down transmission input part comprises an input gear;

said input gear comprises a maximum of about seven teeth;

said friction clutch system comprises means for reducing the release force of said friction clutch system to facilitate the actuation force of said actuator;

said release force reducing means comprises said friction lining means;

said friction lining means comprises friction linings comprising an inside diameter and an outside diameter, the outside diameter is disposed farther from the axis of rotation than the inside diameter, the diameters have a dimensional ratio with respect to one another, and the dimensional ratio of the outside diameter to the inside diameter is substantially 1.4 or less;

said actuator comprises an actuator housing;

said actuator housing is fastened to a component affixed to the engine of a motor vehicle;

said component comprises said clutch housing;

said engaging and disengaging means comprises release fork means for actuating said pressure plate means; and said actuator output element comprises means for connecting to said release fork means.

18. The friction clutch system according to claim 4, wherein said input gear comprises a maximum of about seven teeth.

19. The friction clutch system according to claim 5, wherein said input gear comprises a maximum of about seven teeth.

20. The friction clutch system according to claim 2, wherein:

said friction clutch system comprises means for reducing the release force of said friction clutch system to facilitate the actuation force of said actuator;

said release force reducing means comprises said pressure plate means; and said pressure plate means comprises a pressure plate comprising an inside diameter and an outside diameter, the outside diameter being disposed farther from the axis of rotation than the inside diameter, the outside diameter and the inside diameter having a dimensional ratio with respect to one another, said dimensional ratio of the outside diameter to the inside diameter being substantially 1.4 or less.

* * * * *